US012189886B2

(12) United States Patent
Li et al.

(10) Patent No.: US 12,189,886 B2
(45) Date of Patent: Jan. 7, 2025

(54) SCREEN PROJECTION CONTROL METHOD AND DEVICE, AND ELECTRONIC DEVICE

(71) Applicant: Beijing Bytedance Network Technology Co., Ltd., Beijing (CN)

(72) Inventors: Kai Li, Beijing (CN); Rong Xiang, Beijing (CN); Chenteng Wang, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/254,338

(22) PCT Filed: Nov. 2, 2021

(86) PCT No.: PCT/CN2021/128268
§ 371 (c)(1),
(2) Date: May 24, 2023

(87) PCT Pub. No.: WO2022/111239
PCT Pub. Date: Jun. 2, 2022

(65) Prior Publication Data
US 2024/0012503 A1 Jan. 11, 2024

(30) Foreign Application Priority Data

Nov. 24, 2020 (CN) .......................... 202011331970.1

(51) Int. Cl.
*G06F 3/041* (2006.01)
*G06F 1/16* (2006.01)
*G06F 3/04815* (2022.01)

(52) U.S. Cl.
CPC .......... *G06F 3/0416* (2013.01); *G06F 1/1694* (2013.01); *G06F 3/04815* (2013.01); *G06F 2200/1614* (2013.01)

(58) Field of Classification Search
CPC .. G06F 3/0416; G06F 3/04815; G06F 1/1694; G06F 2200/1614
See application file for complete search history.

(56) References Cited

U.S. PATENT DOCUMENTS 9,268,424 B2 * 2/2016 Hatanaka ............... G08C 17/02
2010/0259491 A1 * 10/2010 Rajamani .......... H04M 1/72409
345/173

(Continued)

FOREIGN PATENT DOCUMENTS

CN 101382858 A 3/2009
CN 102981793 A 3/2013

(Continued)

OTHER PUBLICATIONS

China National Intellectual Property Administration, International Search Report and Written Opinion Issued in Application No. PCT/CN2021/128268, Dec. 29, 2021, WIPO, 11 pages.

(Continued)

*Primary Examiner* — Kenneth Bukowski
(74) *Attorney, Agent, or Firm* — Alleman Hall & Tuttle LLP

(57) ABSTRACT

Embodiments of the present disclosure provide a screen projection control method and device, and an electronic device. The method includes: acquiring touch information sent by a second device, where the touch information includes a touch type, a coordinate position of a touch point on a screen of the second device, and a screen rotation direction of the second device, the screen of the second device and a screen of a first device display a same interface; and determining, according to the screen rotation direction of the second device, a target position on the screen of the first device corresponding to the coordinate position of the touch point, where the target position is a position for (Continued)

performing a touch operation corresponding to the touch type.

20 Claims, 7 Drawing Sheets

(56) References Cited

U.S. PATENT DOCUMENTS

| | | | | |
|---|---|---|---|---|
| 2016/0124599 | A1* | 5/2016 | Joo | G06F 3/0488 |
| | | | | 715/748 |
| 2016/0253142 | A1* | 9/2016 | Choi | G06F 3/1423 |
| | | | | 345/1.3 |
| 2018/0174619 | A1 | 6/2018 | Roy et al. | |
| 2019/0295498 | A1* | 9/2019 | Lee | G06F 3/04886 |
| 2020/0104004 | A1* | 4/2020 | Yaginuma | G06F 3/0416 |
| 2023/0004287 | A1* | 1/2023 | Lin | G06F 3/1454 |

FOREIGN PATENT DOCUMENTS

| | | |
|---|---|---|
| CN | 104144184 A | 11/2014 |
| CN | 106095084 A | 11/2016 |
| CN | 108255398 A | 7/2018 |
| CN | 110109721 A | 8/2019 |
| CN | 110377250 A | 10/2019 |
| CN | 110543278 A | 12/2019 |
| CN | 111432070 A | 7/2020 |
| CN | 112468863 A | 3/2021 |
| EP | 3062214 A1 | 8/2016 |
| EP | 3291565 A1 | 3/2018 |

OTHER PUBLICATIONS

China National Intellectual Property Administration, Office Action Issued in Application No. 202011331970.1, May 24, 2022, 11 pages. Submitted with some English translation.
China National Intellectual Property Administration, Office Action Issued in Application No. 202011331970.1, Oct. 17, 2022, 9 pages. Submitted with some English translation.
China National Intellectual Property Administration, Notice of Rejection in Application No. 202011331970.1, Jan. 19, 2023, 7 pages.
European Patent Office, Extended European Search Report Issued in Application No. 21896740.4, Nov. 8, 2023, Germany, 13 pages.
Communication pursuant to Article 94(3) EPC for European Application No. 21896740.4, mailed Oct. 24, 2024, 5 pages.

* cited by examiner

S201: Acquiring touch information sent by a second device, where the touch information includes a touch type, a coordinate position of a touch point on a screen of the second device, and a screen rotation direction of the second device, the screen of the second device and a screen of a first device display a same interface S202: Determining, according to the screen rotation direction of the second device, a target position on the screen of the first device corresponding to the coordinate position of the touch point, where the target position is a position for performing a touch operation corresponding to the touch type

FIG. 2

S301: Acquiring touch information sent by a second device, where the touch information includes a touch type, a coordinate position of a touch point on a screen of the second device, and a screen rotation direction of the second device, the screen of the second device and a screen of a first device display a same interface S302: Acquiring screen information of the first device S303: Performing, according to the screen information of the first device and the screen rotation direction of the second device, a conversion on the coordinate position of the touch point, to obtain the target position

FIG. 3

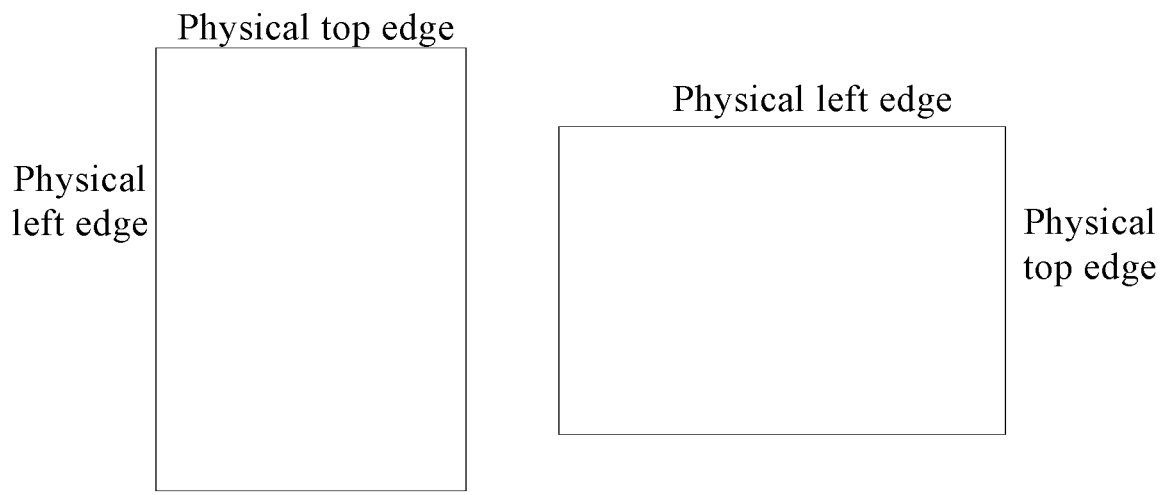
FIG. 4a      FIG. 4b
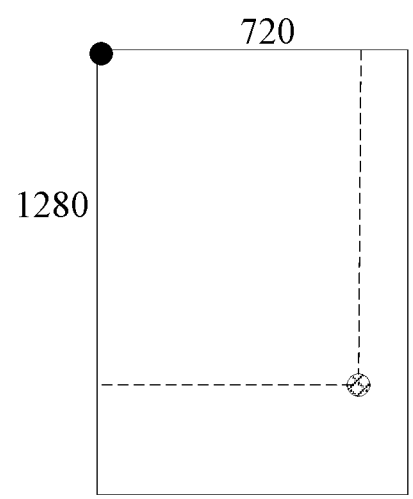 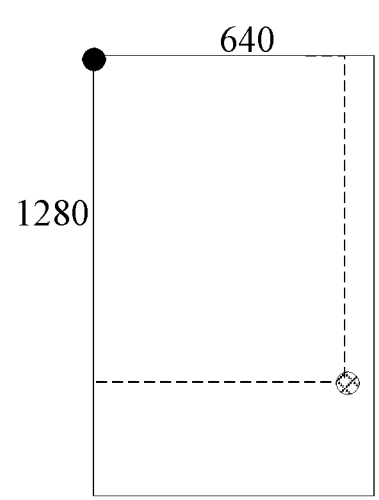
● Coordinate origin      ● Coordinate origin
⊗ Touch point      ⊗ Touch point
FIG. 5a      FIG. 5b

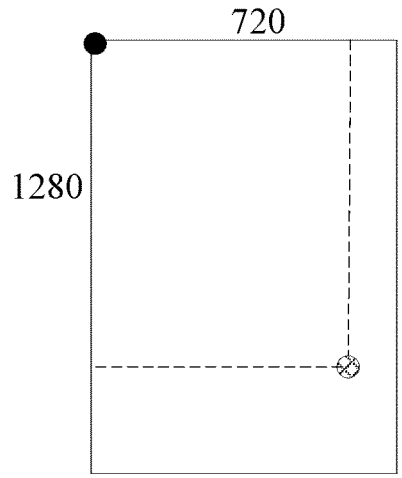
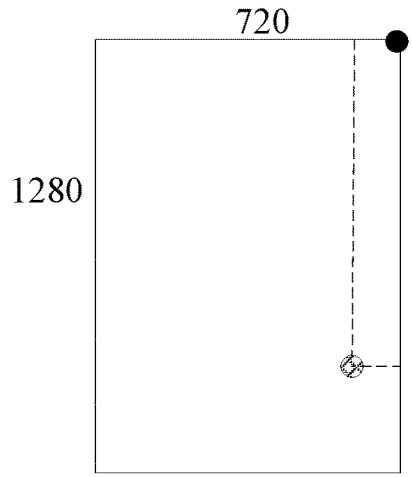

● Coordinate origin
⊗ Touch point

● Coordinate origin
⊗ Touch point

| Generating, in response to a touch operation acting on a screen of the second device, corresponding touch information, where the touch information includes a touch type, a coordinate position of a touch point corresponding to the touch operation on the screen of the second device, and a screen rotation direction of the second device | ~S701 |

| Sending the touch information to a first device, to enable the first device to determine, according to the screen rotation direction of the second device, a target position on a screen of the first device corresponding to the coordinate position of the touch point, where the target position is a position for performing a touch operation corresponding to the touch type | ~S702 |

FIG. 7

SCREEN PROJECTION CONTROL METHOD AND DEVICE, AND ELECTRONIC DEVICE

CROSS-REFERENCE TO RELATED APPLICATION

This application is a National stage of International Application No. PCT/CN2021/128268, filed on Nov. 2, 2021, which claims priority to Chinese patent application No. 202011331970.1, filed on Nov. 24, 2020 to the China National Intellectual Property Administration, entitled "SCREEN PROJECTION CONTROL METHOD AND DEVICE, AND ELECTRONIC DEVICE". Both of the aforementioned patent applications are incorporated herein by reference in their entireties.

TECHNICAL FIELD

Embodiments of the present disclosure relate to the field of computer technology, and in particular, to a screen projection control method and device, and an electronic device.

BACKGROUND

With development of technologies, screen projection functions have become popular. Screen projection refers to synchronizing content displayed by a source device to a client, so that the client also displays the content. After the screen projection, a user can also control the source device in reverse through the client.

In related arts, when controlling the source device in reverse, the user performs a corresponding touch operation on a screen of the client to enable the source device to correspondingly control its displayed content according to the touch operation; the client acquires a touch position and a touch type corresponding to the touch operation, and sends the touch position and the touch type to the source device, to enable the source device to perform, at a touch position of its screen, a control operation corresponding to the touch type, i.e. perform the touch operation.

However, when the screen of the source device and the screen of the client are different-shaped screens, it indicates that screen rotation directions of the source device and the client are different or screen sizes of the source device and the client are different, i.e. resolutions are different. Therefore, the position where the source device performs the control operation is not the position where the user performs the touch operation on the client, i.e. not the touch position corresponding to the touch operation, which results in that the source device is unable to accurately perform the touch operation, so that the content displayed by the source device and the client is asynchronous, i.e. the screen projection being of low synchronization, and the user experience being affected.

SUMMARY

Embodiments of the present disclosure provide a screen projection control method and device, and an electronic device, to overcome the existing problem that the screen projection is of low synchronization.

In a first aspect, an embodiment of the present disclosure provides a screen projection control method applied to a first device. The method includes:
acquiring touch information sent by a second device, where the touch information includes a touch type, a coordinate position of a touch point on a screen of the second device, and a screen rotation direction of the second device, the screen of the second device and a screen of the first device display a same interface; and
determining, according to the screen rotation direction of the second device, a target position on the screen of the first device corresponding to the coordinate position of the touch point, where the target position is a position for performing a touch operation corresponding to the touch type.

In a second aspect, an embodiment of the present disclosure provides a screen projection control method applied to a second device. The method includes:
generating, in response to a touch operation acting on a screen of the second device, corresponding touch information, where the touch information includes a touch type, a coordinate position of a touch point corresponding to the touch operation on the screen of the second device, and a screen rotation direction of the second device; and
sending the touch information to a first device, to enable the first device to determine, according to the screen rotation direction of the second device, a target position on a screen of the first device corresponding to the coordinate position of the touch point, where the target position is a position for performing a touch operation corresponding to the touch type.

In a third aspect, an embodiment of the present disclosure provides a screen projection control device applied to a first device. The screen projection control device includes:
a first transceiver module, configured to acquire touch information sent by a second device, where the touch information includes a touch type, a coordinate position of a touch point on a screen of the second device, and a screen rotation direction of the second device, the screen of the second device and a screen of the first device display a same interface; and
a first processing module, configured to determine, according to the screen rotation direction of the second device, a target position on the screen of the first device corresponding to the coordinate position of the touch point, where the target position is a position for performing a touch operation corresponding to the touch type.

In a fourth aspect, an embodiment of the present disclosure provides a screen projection control device applied to a second device. The screen projection control device includes:
a second processing module, configured to generate, in response to a touch operation acting on a screen of the second device, corresponding touch information, where the touch information includes a touch type, a coordinate position of a touch point corresponding to the touch operation on the screen of the second device, and a screen rotation direction of the second device; and
a second transceiver module, configured to send the touch information to a first device, to enable the first device to determine, according to the screen rotation direction of the second device, a target position on a screen of the first device corresponding to the coordinate position of the touch point, where the target position is a position for performing a touch operation corresponding to the touch type.

In a fifth aspect, an embodiment of the present disclosure provides an electronic device, including: at least one processor and a memory.

The memory has, stored therein, computer executable instructions.

The at least one processor executes the computer executable instructions stored in the memory, to enable the at least one processor to execute the screen projection control method as described above in the first aspect and various possible designs of the first aspect.

In a sixth device, an embodiment of the present disclosure provides an electronic device, including: at least one processor and a memory.

The memory has, stored therein, computer executable instructions.

The at least one processor executes the computer executable instructions stored in the memory, to enable the at least one processor to execute the screen projection control method as described above in the second aspect and various possible designs of the second aspect.

In a seventh aspect, an embodiment of the present disclosure provides a computer readable storage medium in which computer executable instructions are stored. When a processor executes the computer executable instructions, the screen projection control method as described above in the first aspect and various possible designs of the first aspect is implemented.

In an eighth aspect, an embodiment of the present disclosure provides a computer readable storage medium in which computer executable instructions are stored. When a processor executes the computer executable instructions, the screen projection control method as described above in the second aspect and various possible designs of the second aspect is implemented.

In a ninth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the first aspect and various possible designs of the first aspect.

In a tenth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the second aspect and various possible designs of the second aspect.

In an eleventh aspect, an embodiment of the present disclosure also provides a computer program, where the computer program is stored in a readable storage medium, one or more processors of an electronic device can read the computer program from the readable storage medium, and the one or more processors executes the computer program, to enable the electronic device to implement the screen projection control method as described above in the first aspect and various possible designs of the first aspect.

In a twelfth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the second aspect and various possible designs of the second aspect.

The embodiments provide the screen projection control method and device, and the electronic device. The method indicates that a user, when receiving touch information sent by a second device, inputs a touch operation corresponding to the touch information on the second device, and a first device also needs to synchronize the touch operation; then with a screen rotation direction of the touch information, a coordinate position of a touch point of the touch information on the screen of the second device (i.e. the position of the touch operation on the second device) is mapped to the screen of the first device, to determine a target position corresponding to the coordinate position, thereby the touch operation corresponding to the touch type can be performed at the target position, so that the position where the first device performs the touch operation is the position where the user performs the touch operation on the second device, accurate mapping of the coordinate position of the touch point is achieved, and the first device is enabled to accurately perform the touch operation, and thus the first device is enabled to correspondingly control its displayed content according to the touch operation, so that the content displayed by a source device and a client is synchronous, thereby improving the synchronization of screen projection and improving the user experience.

BRIEF DESCRIPTION OF DRAWINGS

In order to explain embodiments of the present disclosure or the technical solutions in the related art more clearly, the drawings that need to be used in the description of the embodiments or the related art will be briefly introduced in the following. Obviously, the drawings in the following description are some embodiments of the present disclosure, and for those of ordinary skill in the art, other drawings can be obtained according to these drawings without paying any creative effort.

FIG. 2 is a schematic flowchart 1 of a screen projection control method provided by an embodiment of the present disclosure.

FIG. 3 is a schematic flowchart 2 of a screen projection control method provided by an embodiment of the present disclosure.

FIG. 4a and FIG. 4b are schematic diagrams of a physical screen provided by an embodiment of the present disclosure.

FIG. 5a and FIG. 5b are schematic diagrams 1 of mapping of a touch point provided by an embodiment of the present disclosure.

FIG. 6a and FIG. 6b are schematic diagrams 2 of mapping of a touch point provided by an embodiment of the present disclosure.

FIG. 7 is a schematic flowchart 3 of a screen projection control method provided by an embodiment of the present disclosure.

DESCRIPTION OF EMBODIMENTS

In order to make the objectives, technical solutions and advantages of embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. All other embodiments obtained by those of ordinary skill in the art without paying any creative effort based on the embodiments in the present disclosure belong to the protection scope of the present disclosure.

Figure 1A:
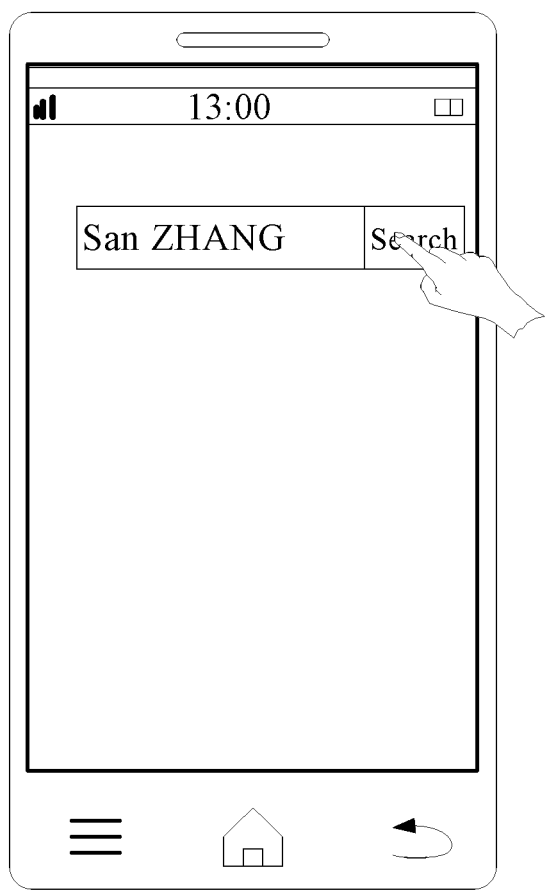
FIG. 1a and FIG. 1B are schematic diagrams respectively of a screen projection scenario provided by an embodiment of the present disclosure.
Figure 1B:
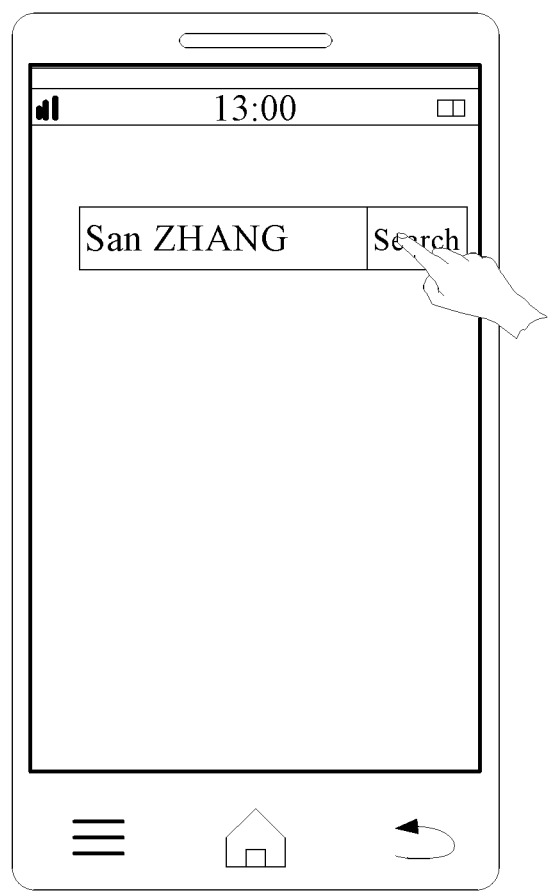

In related arts, when controlling a source device in reverse through a client, the user inputs a corresponding touch operation on a screen of a client to enable the source device to correspondingly control its displayed content according to the touch operation; the client acquires a touch position and a touch type corresponding to the touch operation (as shown in FIG. 1, a user inputs a single point-press operation on a search button on the screen of the client, to make the client perform search), and sends the touch position and the touch type to the source device, to enable the source device to perform, at a touch position of its screen, a control operation corresponding to the touch type, i.e. perform the touch operation. For example, as shown in FIG. 1a, a user inputs a single point-press operation on a search button on the screen of the client, to make the client perform search; accordingly, as shown in FIG. 1B, the source device also needs to perform the single point-press operation on the search button, to make the source device perform search. However, when the screen of the source device and the screen of the client are different-shaped screens, the position where the source device performs the control operation is not the position where the user performs the touch operation on the client, i.e. not the touch position corresponding to the touch operation, which results in that the source device is unable to accurately perform the touch operation, so that the content displayed by the source device and the client is asynchronous, i.e. the screen projection being of low synchronization, and the user experience being affected.

Therefore, regarding the above problems, the technical conception of the present disclosure lies in, when the client receives a touch operation input by the user, determining an actual coordinate, a touch type, and a rotation direction of its screen corresponding to the touch operation, and determining a proportional coordinate corresponding to the touch operation according to the actual coordinate and a resolution of its screen, thereby obtaining a coordinate position corresponding to the touch operation, i.e. representing the coordinate position corresponding to the touch operation in a proportional manner, then sending the coordinate position, the touch type, and the screen rotation direction of the client to the source device, to enable the source device to perform a proportional conversion on the coordinate position using a resolution of its own screen, a rotation direction of its own screen and the screen rotation direction of the client, to obtain a target position corresponding to the coordinate position, in order that the coordinate position is accurately mapped to the screen of the source device, the source device is enabled to accurately perform a touch operation, and thus the source device is enabled to correspondingly control its displayed content according to the touch operation, so that the content displayed by the source device and the client is synchronous, thereby achieving a same touch effect, improving the synchronization of screen projection, and the user experience being high.

Referring to FIG. 2, FIG. 2 is a schematic flowchart 1 of a screen projection control method provided by an embodiment of the present disclosure. The method of this embodiment may be applied to a first device, the first device is an electronic device such as a mobile terminal. The screen projection control method includes the following.

S201: acquiring touch information sent by a second device, where the touch information includes a touch type, a coordinate position of a touch point on a screen of the second device, and a screen rotation direction of the second device, the screen of the second device and a screen of the first device display a same interface.

In embodiments of the present disclosure, during screen projection, the second device and the first device would display the same interface. When a user performs a touch operation at a certain position on the screen of the second device to perform a corresponding operation on the displayed interface, the first device also needs to perform the touch operation at a corresponding position of its screen to perform a same operation on its displayed interface, thereby achieving synchronous control of the devices. Therefore, the second device, when detecting that the user inputs the corresponding touch operation on its screen, acquires the touch type corresponding to the touch operation and the coordinate position of the touch point on the screen of the second device; and in order to avoid a possibility that the position on the first device where the touch operation needs to be performed cannot be accurately determined according to only the coordinate position since the screens of the first device and the second device are different-shaped screens, the second device further needs to acquire a current rotation direction of its own screen and takes it as the screen rotation direction of the first device.

After obtaining the touch type corresponding to the touch operation, the coordinate position of the touch point on the screen of the second device, and the screen rotation direction, the second device generates corresponding touch information according to the touch type, the coordinate position and the screen rotation direction, and sends it to the first device. The first device receives the touch information sent by the second device, to use the touch information to achieve synchronously control of the interface.

The screen rotation direction of the second device is a direction of the screen, which includes 0 degree (i.e. rotating by 0 degree), 90 degrees (i.e. rotating by 90 degrees), 180 degrees (i.e. rotating by 180 degree), and 270 degrees (i.e. rotating by 270 degrees).

Specifically, when the direction of the screen is 0 degree and 180 degrees, the screen is a portrait screen, when the direction of the screen is 90 degrees and 270 degrees, the screen is a landscape screen.

The touch type corresponding to the touch operation is a type to which the touch operation belongs. The coordinate position of the touch point on the screen of the second device is an input position of the touch point corresponding to the touch operation on the screen, i.e. when inputting the touch operation on the screen of the second device, the user can touch on the screen through a finger, and the position where the finger is touching is the input position of the touch point.

The first device may be the source device or the client, the second device may also be the client or the source device, the first device and the second device are different. For example, when the first device is the source device, the second device is the client; when the first device is the client, the second device is the source device.

In a possible implementation, the touch information is generated based on a preset touch event transfer protocol. Since the preset touch event transfer protocol defines a standard format of the touch information and a meaning represented by a respective character, by using this preset touch event transfer protocol, the touch information sent by the second device can be quickly parsed to obtain the content required by it, i.e. obtain the touch type, the touch position, and the rotation direction of the screen of the second device.

S202: determining, according to the screen rotation direction of the second device, a target position on the screen of the first device corresponding to the coordinate position of the touch point, where the target position is a position for performing a touch operation corresponding to the touch type.

In disclosed embodiments, the first device, when obtaining the touch information sent by the second device, needs to perform the corresponding touch operation using the touch information to make that the touch operation performed by the user on the second device can be veritably feedback to the first device. Then the first device determines, based on the screen rotation direction of the second device in the touch information, the position on its own screen corresponding to the coordinate position of the touch point corresponding to the touch operation, i.e. determines the target position; the target position is the position on the screen of the first device where the touch operation needs to be performed, which is equivalent to the position where the user inputs the touch operation on the screen of the second device.

In the embodiments of the present disclosure, the first device, after determining the target position, determines the touch operation according to the touch type, i.e. performs, at the target position, the touch operation corresponding to the touch type; specifically, the first device performs, in response to the touch operation, corresponding control on the interface displayed by its screen, thereby enabling the content displayed by the first device and the second device to be synchronous, and achieving synchronous control.

The target position corresponds to the coordinate position, i.e. a control effect achieved by the first device performing the touch operation at the target position is the same as a control effect achieved by the touch operation input by the user at the coordinate position on the second device.

It can be known, from the above description, when receiving the touch information sent by the second device, it indicates that a user inputs on the second device the touch operation corresponding to the touch information, and the first device also needs to synchronize the touch operation; then with a screen rotation direction of the touch information, a coordinate position of a touch point of the touch information on the screen of the second device (i.e. the position of the touch operation on the second device) is mapped to the screen of the first device, to determine a target position corresponding to the coordinate position, thereby the touch operation corresponding to the touch type can be performed at the target position, so that the position where the first device performs the touch operation is the position where the user performs the touch operation on the second device, accurate mapping of the coordinate position of the touch point is achieved, and the first device is enabled to accurately perform the touch operation, and thus the first device is enabled to correspondingly control its displayed content according to the touch operation, so that the content displayed by the first device and the second device is synchronous, i.e. the content displayed by a client and a source device is synchronous, thereby increasing the synchronization of screen projection and the user experience being high.

Referring to FIG. 3, FIG. 3 is a schematic flowchart 2 of a screen projection control method provided by an embodiment of the present disclosure. In this embodiment, detailed description will be made to the process of determining, using screen information of the first device, the position on the first device of the touch operation input by the user on the second device, i.e. determining the target position, in detail; the screen projection control method includes the following.

S301: acquiring touch information sent by a second device, where the touch information includes a touch type, a coordinate position of a touch point on a screen of the second device, and a screen rotation direction of the second device, the screen of the second device and a screen of a first device display a same interface.

S302: acquiring screen information of the first device.

S303: performing, according to the screen information of the first device and the screen rotation direction of the second device, a conversion on the coordinate position of the touch point, to obtain the target position.

In the embodiment of present disclosure, when the user inputs the corresponding touch operation on the screen of the second device, the second device determines the touch information corresponding to the touch operation, where the touch information includes the coordinate position of the touch point on the screen of the second device and a current rotation direction of its screen (i.e. the screen rotation direction of the second device), the coordinate position of the touch point on the screen of the second device is the position where the user inputs the touch operation, i.e. the position of the touch point corresponding to the touch operation; and sends the touch information to the first device. When the first device receives the touch information sent by the second device, it indicates that the first device also needs to synchronously perform the touch operation; then using the screen information of the first device and the screen rotation direction of the second device included by the touch information, the first device performs information conversion on the coordinate position to obtain the target position, i.e. obtain the position for performing the touch operation on the first device.

In the embodiment of the present disclosure, the screen information of the first device includes a screen rotation direction of the first device and size information of the screen of the first device.

The screen rotation direction of the first device is also a direction of the screen, which includes 0 degree (i.e. rotating by 0 degree), 90 degrees (i.e. rotating by 90 degrees), 180 degrees (i.e. rotating by 180 degrees), and 270 degrees (i.e. rotating by 270 degrees).

The size information of the screen of the first device includes a height of the screen of the first device and a width of the screen of the first device. The height of the screen of the first device is actually the logical height of the screen of the first device, and the width of the screen of the first device is actually the logical width the screen of the first device.

In addition, in a possible implementation, when the screen rotation direction is 0 degree or 180 degrees, the logical width is a width of the physical top or bottom edge of the screen, and the logical height is a width of the physical left or right edge of the screen. For example, as shown in FIG. 4a, the screen rotation direction is 0 degree, the logical width is the width of the physical top or bottom edge of the screen, and the logical height is the width of the physical left or right edge of the screen.

When the screen rotation direction is 90 degrees or 270 degrees, the logical width is a width of the physical left or right edge of the screen, and the logical height is a width of the physical top or bottom edge of the screen. For example, as shown in FIG. 4b, the screen rotation direction is 90 degrees, the logical height is the width of the physical top or bottom edge of the screen, and the logical width is the width of the physical left or right edge of the screen.

In addition, in a possible implementation, when the screen rotation direction is 0 degree, the coordinate origin is the physical top left corner of the screen; when the screen rotation direction is 90 degrees, the coordinate origin is the physical top right corner of the screen; when the screen rotation direction is 180 degrees, the coordinate origin is the physical bottom right corner of the screen; when the screen rotation direction is 270 degrees, the coordinate origin is the physical bottom left corner of the screen.

It can be understood that the logical height of the screen changes with the change of the rotation direction of the screen. The physical left, right, top, and bottom edges of the screen are fixed, which are the left, right, top, and bottom edges determined when the screen is vertical (i.e. when the screen rotation direction is 0 degree); and the physical left, right, top, and bottom edges of the screen do not change with the change of the rotation direction of the screen.

In this embodiment, an implementation of S303 includes:
when it is determined that the screen rotation direction of the first device and the screen rotation direction of the second device are the same, performing, according to the size information of the screen of the first device, the conversion on the coordinate position of the touch point based on a first preset rule, to obtain the target position; and
when it is determined that the screen rotation direction of the first device and the screen rotation direction of the second device are different, performing, according to the size information of the screen of the first device, the conversion on the coordinate position of the touch point based on a second preset rule, to obtain the target position.

In the embodiment of the present disclosure, when the screen rotation direction of the first device and the screen rotation direction of the second device are the same, directly based on the first preset rule, performing the conversion on the coordinate position of the touch point using the size information of the screen of the first device, to achieve a proportional conversion of the coordinate position; when the screen rotation direction of the first device and the screen rotation direction of the second device are different, based on the second preset rule, performing the conversion on the coordinate position of the touch point using the size information of the screen of the first device, to achieve a proportional and directional conversion. Thereby, the coordinate position can be accurately mapped to the screen of the first device, in turn the touch operation input by the user on the second device can be veritably feedback to the screen of the first device.

The coordinate position of the touch point includes a proportional width coordinate and a proportional height coordinate of the touch point. The proportional width coordinate of the touch point indicates a proportion of the width coordinate of the touch point to a width of the screen of the second device, and the proportional height coordinate of the touch point indicates a proportion of the height coordinate of the touch point to the height of the screen of the second device. The target position corresponding to the coordinate position of the touch point includes a target height coordinate and a target width coordinate.

Specifically, when inputting the touch operation on the screen of the second device, the user can touch on the screen through at least one finger, i.e. the touch operation corresponds to at least one touch point; therefore, when performing, according to the size information of the screen of the first device, the conversion on the coordinate position of the touch point based on the first preset rule, the coordinate position of each touch point corresponding to the touch operation needs to be mapped, i.e. for each touch point, performing, according to the size information of the screen of the first device, the conversion on the coordinate position of the touch point based on the first preset rule, to obtain the target position corresponding to the coordinate position of this touch point. Similarly, when performing, according to the size information of the screen of the first device, the conversion on the coordinate position of the touch point based on the second preset rule, the position of each touch point corresponding to the touch operation needs to be mapped, i.e. for each touch point, performing, according to the size information of the screen of the first device, the conversion on the coordinate position of the touch point based on the second preset rule, to obtain the target position corresponding to the coordinate position of this touch point.

Furthermore, in a possible implementation, the first preset rule is $TX=Width*OX$, $TY=Height*OY$, where TX is the target width coordinate, Width is the width of the screen of the first device, OX is the proportional width coordinate of the touch point, TY is the target height coordinate, Height is the height of the screen of the first device, and OY is the proportional height coordinate of the touch point. The second preset rule is $TX=Width*OY$, $TY=Height*(1-OX)$, where TX is the target width coordinate, Width is the width of the screen of the first device, OY is the proportional height coordinate of the touch point, TY is the target height coordinate, Height is the height of the screen of the first device, and OX is the proportional width coordinate of the touch point.

Specifically, a process of performing, according to the size information of the screen of the first device, the conversion on the coordinate position of the touch point based on the first preset rule, to obtain the target position corresponding to the coordinate position is: based on $TX=Width*OX$, i.e. acquiring a product of the proportional width coordinate of the touch point and the width of the screen of the first device, and using it as the target width coordinate; and based on $TY=Height*OY$, i.e. acquiring a product of the proportional height coordinate of the touch point and the height of the screen of the first device, and using it as the target height coordinate.

In the embodiment of the present disclosure, since the proportional width coordinate of the touch point indicates a proportion of the width coordinate corresponding to the touch point to the width of the screen of the second device, and the screen rotation direction of the first device and the screen rotation direction of the second device are the same, the proportional width coordinate of the touch point is directly multiplied by the width of the screen of the first device, the product is the target width coordinate corresponding to the coordinate position of the touch point, i.e. the width coordinate of the touch point on the screen of the first device. Similarly, since the proportional height coordinate of the touch point indicates a proportion of the height coordinate corresponding to the touch point to the height of the screen of the second device, and the screen rotation direction of the first device and the screen rotation direction of the second device are the same, the proportional height coordinate of the touch point is directly multiplied by the height of the screen of the first device, the product is the target height coordinate corresponding to the coordinate position of the touch point, i.e. the height coordinate of the touch point on the screen of the first device.

Taking a specific application scenario as an example, a rotation direction of the first device and a rotation direction of the second device are the same, for example, both of them are 0 degree, as shown in FIG. 5a, the width of the screen of the second device is 720, the height of the screen of the second device is 1280, the coordinate of touch point 1 is (700, 1100), i.e. the width coordinate of the touch point 1 is 700, the height coordinate of the touch point 1 is 1100, then the proportional width coordinate of the touch point 1 is 700/720=0.97, the proportional height coordinate of the touch point is 1100/1280=0.86. When converting the position of touch point 1 on the screen of the second device to the position of touch point 1 on the screen of the first device, i.e. determining the coordinate of operation point 1 corresponding to touch point 1, a product of the proportional width coordinate of touch point 1 and the width of the screen of the first device is taken as the target width coordinate, i.e. the width coordinate of touch point 1 on the screen of the first device=640*0.97; at the same, a product of the proportional height coordinate of touch point 1 and the height of the screen of the first device is taken as the target height coordinate, i.e. the height coordinate of touch point 1 on the screen of the first device=1280*0.86.

In the embodiment of the present disclosure, when the screen sizes of the first device and the second device are inconsistent, i.e. when the resolutions of the first device and the second device are inconsistent, a proportional conversion is performed on the position of the touch point in the proportional manner, to determine the position of the touch point on the screen of the first device; thereby the accurate synchronization of the touch operation can be achieved, so that the touch operation performed by the user on the second device can be veritably feedback to the first device, a problem that some screen touch events cannot be transferred or exceed a screen boundary of the first device after transmitted to the first device can be avoided, the accurate transmission of the touch operation (i.e. the touch event) is achieved.

Furthermore, in a possible implementation, if the screen rotation direction of the second device is a first preset direction, and the screen rotation direction of the first device is a second preset direction, then a process of performing, according to the size information of the screen of the first device, the conversion on the coordinate position of the touch point based on the second preset rule, to obtain the position of the operation point corresponding to the touch point is: based on TX=Width*OY, i.e. acquiring a product of the proportional height coordinate of the touch point and the width of the screen of the first device, and using it as the target width coordinate; and is based on TY=Height*(1−OX), i.e. acquiring a difference between 1 and the proportional width coordinate, and acquiring a product of the difference and the height of the screen of the first device, to obtain the target height coordinate.

Specifically, when the screen rotation directions of the first device and the second device are inconsistent, the screen rotation directions of the first device and the second device need to be combined to perform the conversion on the coordinate position of the touch point.

When the screen rotation direction of the second device is a first preset direction, and the screen rotation direction of the first device is a second preset direction, i.e. when a direction of the screen of the second device is 0 degree, and a direction of the screen of the first device is 90 degrees, at this time, the screen of the second device is a portrait screen, and the screen of the first device is a landscape screen; then for each touch point, the proportional height coordinate of the touch point is multiplied by the width of the screen of the first device, the product is the target width coordinate corresponding to the coordinate position of the touch point, i.e. the width coordinate of the touch point on the screen of the first device. Similarly, when determining the target height coordinate corresponding to the coordinate position, a difference between 1 and the proportional width coordinate is calculated, and a product of the difference and the height of the screen of the first device is calculated, the product is the target height coordinate corresponding to the coordinate position of the touch point, i.e. the height coordinate of the touch point on the screen of the first device.

Taking a specific application scenario as an example, a rotation direction of the screen of the second device is 0 degree, and a rotation direction of the screen of the first device is 90 degrees which is different from the direction of the second device, for example, as shown in FIG. 6a, the width of the screen of the second device is 720, the height of the screen of the second device is 1280, the actual coordinate of touch point 1 is (700, 1100), i.e. the width coordinate of the touch point 1 is 700, the height coordinate of the touch point 1 is 1100, then the proportional width coordinate of the touch point 1 is 700/720=0.97, the proportional height coordinate of touch point 1 is 1100/1280=0.86, i.e. the proportional coordinate of touch point 1 is (0.97, 0.86). When converting the position the touch point 1 on the screen of the second device to the position of touch point 1 on the screen of the first device, i.e. determining the target position corresponding to the coordinate position of touch point 1, a product of the proportional height coordinate of touch point 1 and the width of the screen of the first device is taken as the target width coordinate of the target position, i.e. the target width coordinate of touch point 1 on the screen of the first device=720*0.86; at the same, the target height coordinate of touch point 1 on the screen of the first device is determined according to (1-0.97)*1280.

In the embodiment of the present disclosure, when the screen directions of the first device and the second device are inconsistent, i.e. when one screen of the first device and the second device is a portrait screen, and the other one is a landscape screen, a proportional conversion and a direction conversion are performed on the coordinate position of the touch point in the proportional manner, to determine the target position of the touch point on the screen of the first device; thereby the accurate synchronization of the touch operation can be achieved, so that the touch operation performed by the user on the second device can be veritably feedback to the first device, a problem that some screen touch events cannot be transferred or exceed a screen boundary of the first device after transmitted to the first device can be avoided, the accurate transmission of the touch operation (i.e. the touch event) is achieved, therefore the same touch effect is achieved.

It should be emphasized that when the screen rotation direction of the first device is inconsistent with the screen rotation direction of the second device, the target position can be determined according to the above principle when the screen rotation direction of the first device is 90 degrees and the screen rotation direction of the second device is 0 degree. Here, it will not be fully described.

It can be understood that when there are plural touch points, a corresponding touch operation is performed based on all target positions after determining a corresponding target position of a coordinate position of a respective touch point.

In this embodiment, after determining the target position, i.e. the first device reports that after the coordinate position of the touch point is mapped to its screen, the touch operation is determined by the touch type. For example, when the touch type is a single point movement type, the touch operation is determined to be a single point movement operation, and then the touch operation is performed at the target position, which is equivalent to that the user inputs the touch operation at the coordinate position on the second device. After performing the touch operation, the first device continues to perform the control operation corresponding to the touch operation, to achieve a synchronous response of the touch operation, thereby achieving the synchronous control of its current displayed interface.

Referring to FIG. 7, FIG. 7 is a schematic flowchart 3 of a screen projection control method provided by an embodiment of the present disclosure. The method of this embodiment may be applied to a second device, the second device is an electronic device such as a mobile terminal. The screen projection control method includes the following.

S701, generating, in response to a touch operation acting on a screen of the second device, corresponding touch information, where the touch information includes a touch type, a coordinate position of a touch point corresponding to the touch operation on the screen of the second device, and a screen rotation direction of the second device.

In the embodiment of present disclosure, after the second device acquires the touch operation input by the user on its own screen, a touch type corresponding to the touch operation, a coordinate position of a touch point on the screen of the second device, and a current rotation direction of the screen (i.e. the screen rotation direction of the second device) are acquired, and are composed into the touch information corresponding to the touch operation.

In addition, in a possible implementation, the second device, after acquiring the touch operation input by the user on its own screen, also needs to perform a corresponding control operation on its displayed interface according to the touch operation, i.e. perform the corresponding control operation in response to the touch operation acting on the screen of the second device, for example, zoom in on a certain region.

In a possible implementation, the touch operation corresponds to at least one touch point; the touch type corresponding to the touch operation indicates a type of a gesture event, which includes a single-point-touch (i.e. single-finger touch) type and a multi-point-touch (i.e. multi-finger touch) type.

Furthermore, the single-point-touch type further includes a single-point-press operation type (i.e. ACTION_DOWN), a single-point-release operation type (i.e. ACTION_UP), and a single-point-move type (i.e. ACTION_MOVE). The multi-point-touch type includes a multi-point-press operation type (ACTION_POINT_DOWN) and a multi-point-release type (ACTION_POINT_UP).

The multi-point-touch includes double-point touch (i.e. double-finger touch), three-point touch (i.e. three-finger touch), and four-point touch (i.e. four-finger touch), and so on. When the touch operation is the multi-point-touch type, a distinguishment can also be made through pointer numbers of fingers, such as ID (Identity document, Identification number).

S702, sending the touch information to a first device, to enable the first device to determine, according to the screen rotation direction of the second device, a target position on a screen of the first device corresponding to the coordinate position of the touch point, where the target position is a position for performing a touch operation corresponding to the touch type.

In the embodiment of the present disclosure, since the content displayed by the first device and the second device needs to be synchronous, when the second device acquires the touch operation input by the user and performs the corresponding control operation according to the touch operation, the first device also needs to synchronously perform the touch operation, thereby performing the corresponding control operation according to the touch operation. Therefore, the second device sends the touch information to the first device, to enable the first device to accurately perform the touch operation using the touch information.

In the embodiment of the present disclosure, considering that the screens of the first device and the second device are different-shaped screens, the second device, after acquiring the touch operation input by the user on a screen, acquires the coordinate position corresponding to the touch point corresponding to the touch operation, the touch type, and the current rotation direction of the screen, and sends them to the first device, to enable the first device to accurately obtain the target position corresponding to the coordinate position (i.e. obtain a position where the touch operation needs to be performed on the screen of the first device) according to the rotation direction and the coordinate position, to accurately map the touch operation to the screen of the first device, rather than directly take the coordinate position as the target position; thereby the first device can be enabled to accurately perform the touch operation, in turn the content displayed by the first device and the second device is synchronous, thereby the synchronization of screen projection is improved, and the user experience is high.

Figure 8:
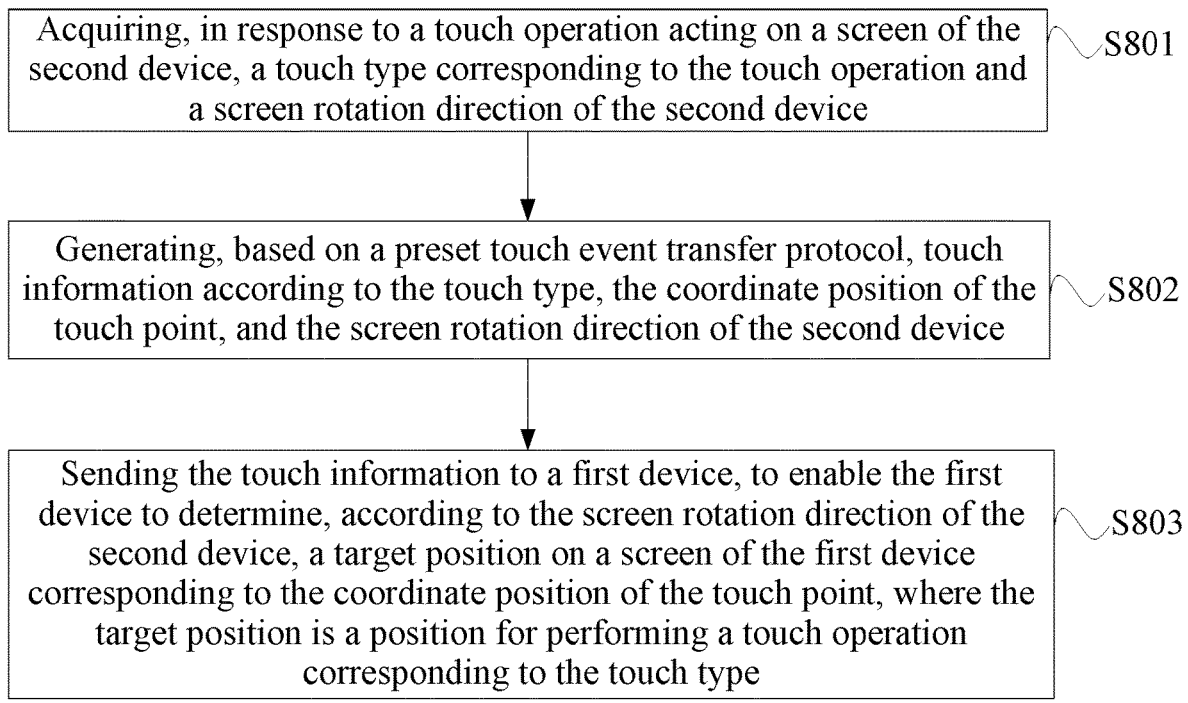
FIG. 8 is a schematic flowchart 4 of a screen projection control method provided by an embodiment of the present disclosure.

Referring to FIG. 8, FIG. 8 is a schematic flowchart 4 of a screen projection control method provided by an embodiment of the present disclosure. In this embodiment, detailed description will be made to the process of determining, using the position of the touch point corresponding to the touch operation, the touch position; the screen projection control method includes the following.

S801, acquiring, in response to a touch operation acting on a screen of the second device, a touch type corresponding to the touch operation and a screen rotation direction of the second device.

S802, generating, based on a preset touch event transfer protocol, touch information according to the touch type, the coordinate position of the touch point, and the screen rotation direction of the second device.

In this embodiment, after the user inputs the touch operation on the screen of the second device, the coordinate position of the respective touch point corresponding to the touch operation is determined, for example, when the touch operation is input by the user through a single finger, at this time, the touch type includes the single-point touch, i.e. the touch operation corresponds to one touch point.

The coordinate position of the touch point includes a proportional width coordinate and a proportional height coordinate of the touch point. The proportional width coordinate of the touch point is a proportion of an actual width coordinate of the touch point to a width of the screen of the second device. The proportional height coordinate of the touch point is a proportion of an actual height coordinate of the touch point to the height of the screen of the second device.

In a possible implementation, when determining the coordinate position of the respective touch point corresponding into a corresponding position according to a preset format, to obtain the corresponding touch information.

The preset touch event transfer protocol includes encoding and a representation format corresponding to a touch type, a representation format of a position of a touch point, and a representation format of a screen rotation direction, specifically as follows:

```
{
    X : Float        //X coordinate, a floating point between 0 ~ 1
    Y: Float         //Y coordinate, a floating point between 0 ~ 1
    Rotation: Int    //Screen rotation direction 0 90 180 270
    Action: Int      // Event type:
                     //    ACTION_DOWN = 0 (single-finger)
                     //    ACTION_UP = 1 (single-finger)
                     //    ACTION_MOVE = 2 (single-finger)
                     //      ACTION_POINT_DOWN = 261 (double-finger), 517 (three-finger), 773 (four-finger)
                     //            ACTION_POINT_UP = 262 (double-finger), 518 (three-finger), 774 (four-finger)
        pointerId: Int    // when in a multi-point-touch, a pointer ID that distinguishing a finger,
}
``` to the touch operation, size information of the screen of the second device is acquired, where the size information of the screen of the second device includes a width of the screen of the second device and a height of the screen of the second device. For each touch point, an actual width coordinate and an actual height coordinate corresponding to the touch point are acquired; and a ratio of the actual width coordinate to the width of the screen of the second device is acquired, and it is used as the proportional width coordinate corresponding to the touch point. A ratio of the actual height coordinate to the height of the screen of the second device is acquired, and it is used as the proportional height coordinate corresponding to the touch point.

Specifically, for each touch point corresponding to the touch operation, the actual coordinate corresponding to the touch point is acquired, where the actual coordinate includes the actual width coordinate and the actual height coordinate; and the actual width coordinate is divided by the width of the screen of the second device to obtain the proportional width coordinate corresponding to the touch point; similarly, the actual height coordinate is divided by the height of the screen of the second device to obtain the proportional height coordinate corresponding to the touch point.

In the embodiment of the present disclosure, when determining the coordinate position of the touch point, a proportion of the actual coordinate is determined according to the actual coordinate of the touch point and the size of the screen of the second device, to obtain the proportional coordinate of the touch point, and the proportional coordinate of the touch point is sent to the first device. Thereby when calculating the target position, the first device does not need to know the size of the screen of the second device, and can directly use the proportional coordinate to determine the target position, to achieve accurate determination of the target position.

In the embodiment of the present disclosure, after obtaining the touch type corresponding to the touch operation, the coordinate position of the touch point and the screen rotation direction of the second device, encoding corresponding to the touch type is determined according to the preset touch event transfer protocol; and the encoding corresponding to the touch type, the coordinate position of the touch point and the screen rotation direction of the second device are written For example, when the touch type corresponding to the touch operation is a double-finger press operation type, its corresponding encoding is 261, i.e. ACTION_POINT_DOWN=261. The touch position is the proportional coordinate corresponding to the touch point, represented by X and Y. When the number of touch points is greater than 1, the distinguishment is possible through the pointer identity (pointerId).

S803, sending the touch information to a first device, to enable the first device to determine, according to the screen rotation direction of the second device, a target position on a screen of the first device corresponding to the coordinate position of the touch point, where the target position is a position for performing a touch operation corresponding to the touch type.

In this embodiment, when determining the coordinate position of the touch point, the proportional coordinate of the touch point on the screen of the second device is determined, to enable that the second device can use the proportional coordinate of the touch point to determine its position on the first device, i.e. determine the target position corresponding to the coordinate position of the touch point, to achieve the accurate mapping of the position. Thereby the target position of the touch operation on the screen of the first device can be accurately determined, the accurate mapping of the coordinate position of the touch operation is achieved, to enable that the first device can perform the touch operation at an accurate position and perform the corresponding control operation according to the touch operation, to achieve the synchronization and the synchronous response of the touch operation, so that the content displayed by the second device and the first device can be synchronous, in turn the synchronization of screen projection is improved.

Figure 9:
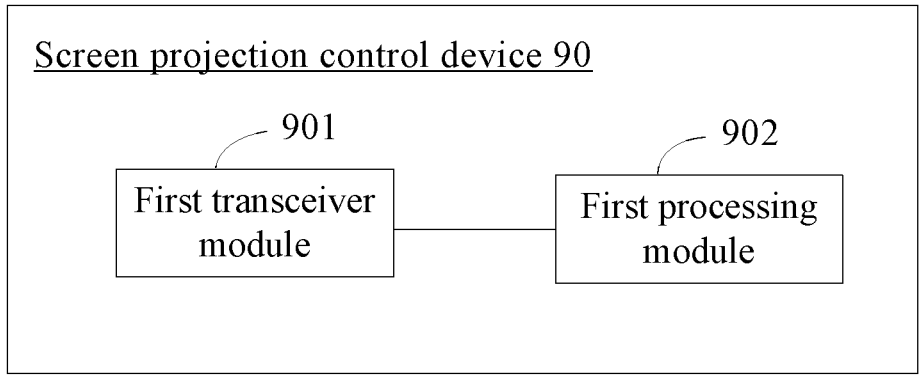
FIG. 9 is a structural block diagram 1 of a screen projection control device provided by an embodiment of the present disclosure.

Corresponding to the screen projection control method described above according to the embodiments of FIG. 2 to FIG. 3, FIG. 9 is a structural block diagram 1 of a screen projection control device provided by an embodiment of the present disclosure. For ease of illustration, only parts related to the embodiments of the present disclosure are shown. Referring to FIG. 9, the screen projection control device 90 includes: a first transceiver module 901 and a first processing module 902.

The first transceiver module 901 is configured to acquire touch information sent by a second device, where the touch information includes a touch type, a coordinate position of a touch point on a screen of the second device, and a screen rotation direction of the second device, the screen of the second device and a screen of the first device display a same interface.

The first processing module 902 is configured to determine, according to the screen rotation direction of the second device, a target position on the screen of the first device corresponding to the coordinate position of the touch point; where the target position is a position for performing a touch operation corresponding to the touch type.

In one embodiment of the present disclosure, the first processing module 902 is further configured to:
 acquire screen information of the first device; and
 perform, according to the screen information of the first device and the screen rotation direction of the second device, a conversion on the coordinate position of the touch point, to obtain the target position.

In the embodiment of the present disclosure, the screen information of the first device includes a screen rotation direction of the first device and size information of the screen of the first device; and the first processing module 902 is further configured to:
 when it is determined that the screen rotation direction of the first device and the screen rotation direction of the second device are the same, perform, according to the size information of the screen of the first device, the conversion on the coordinate position of the touch point based on a first preset rule, to obtain the target position; and
 when it is determined that the screen rotation direction of the first device and the screen rotation direction of the second device are different, perform, according to the size information of the screen of the first device, the conversion on the coordinate position of the touch point based on a second preset rule, to obtain the target position.

In one embodiment of the present disclosure, the coordinate position of the touch point includes a proportional width coordinate and a proportional height coordinate of the touch point. The target position includes a target width coordinate and a target height coordinate. The size information of the screen of the first device includes a width and a height of the screen of the first device.

In one embodiment of the present disclosure, the first preset rule is $TX=Width*OX$, $TY=Height*OY$, where TX is the target width coordinate, Width is the width of the screen of the first device, OX is the proportional width coordinate of the touch point, TY is the target height coordinate, Height is the height of the screen of the first device, and OY is the proportional height coordinate of the touch point.

In one embodiment of the present disclosure, the second preset rule is $TX=Width*OY$, $TY=Height*(1-OX)$, where TX is the target width coordinate, Width is the width of the screen of the first device, OY is the proportional height coordinate of the touch point, TY is the target height coordinate, Height is the height of the screen of the first device, and OX is the proportional width coordinate of the touch point.

In one embodiment of the present disclosure, the touch information is generated based on a preset touch event transfer protocol.

The device provided by this embodiment can be used to perform the technical solutions of the above method embodiments of FIG. 2 and FIG. 3, which is implemented with the similar principles and produces the similar technical effects. Detailed description will be omitted in this embodiment.

Figure 10:
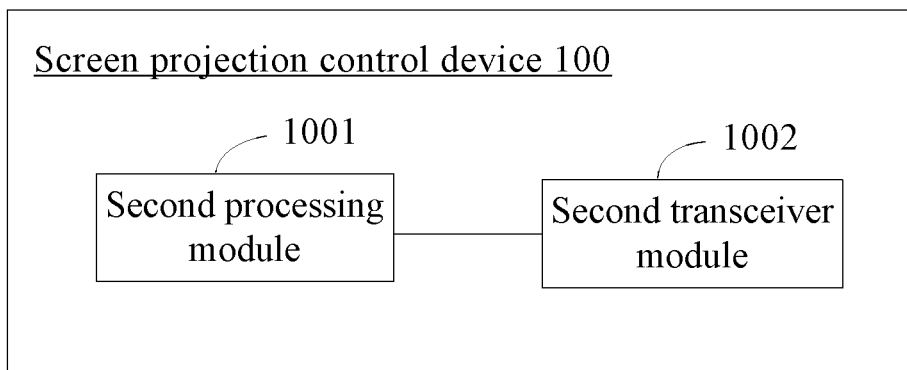
FIG. 10 is structural block diagram 2 of a screen projection control device provided by an embodiment of the present disclosure.

Corresponding to the screen projection control method described above according to the embodiments of FIG. 7 and FIG. 8, FIG. 10 is a structural block diagram 2 of a screen projection control device provided by an embodiment of the present disclosure, and the screen projection control device is applied to the second device. For ease of illustration, only parts related to the embodiments of the present disclosure are shown. Referring to FIG. 10, the screen projection control device 100 includes: a second processing module 1001 and a second transceiver module 1002.

The second processing module 1001 is configured to generate, in response to a touch operation acting on a screen of the second device, corresponding touch information, where the touch information includes a touch type, a coordinate position of a touch point corresponding to the touch operation on the screen of the second device, and a screen rotation direction of the second device.

The second transceiver module 1002 is configured to send the touch information to a first device, to enable the first device to determine, according to the screen rotation direction of the second device, a target position on a screen of the first device corresponding to the coordinate position of the touch point, where the target position is a position for performing a touch operation corresponding to the touch type.

In one embodiment of the present disclosure, the second processing module 1001 is further configured to:
 acquire the touch type corresponding to the touch operation and the screen rotation direction of the second device; and
 generate, based on a preset touch event transfer protocol, the touch information according to the touch type, the coordinate position of the touch point, and the screen rotation direction of the second device.

In one embodiment of the present disclosure, the coordinate position of the touch point includes a proportional width coordinate and a proportional height coordinate of the touch point; and the second processing module 1001 is further configured to:
 acquire size information of the screen of the second device, where the size information of the screen of the second device includes a width of the screen of the second device and a height of the screen of the second device;
 acquire, for each touch point, an actual width coordinate and an actual height coordinate of the touch point, and acquire a ratio of the actual width coordinate to the width of the screen of the second device and use it as the proportional width coordinate of the touch point; and
 acquire a ratio of the actual height coordinate to the height of the screen of the second device and use it as the proportional height coordinate of the touch point.

The device provided by this embodiment can be used to perform the technical solutions of the above method embodiments of FIG. 7 and FIG. 8, which is implemented with the similar principles and produces the similar technical effects. Detailed description will be omitted in this embodiment.

Figure 11:
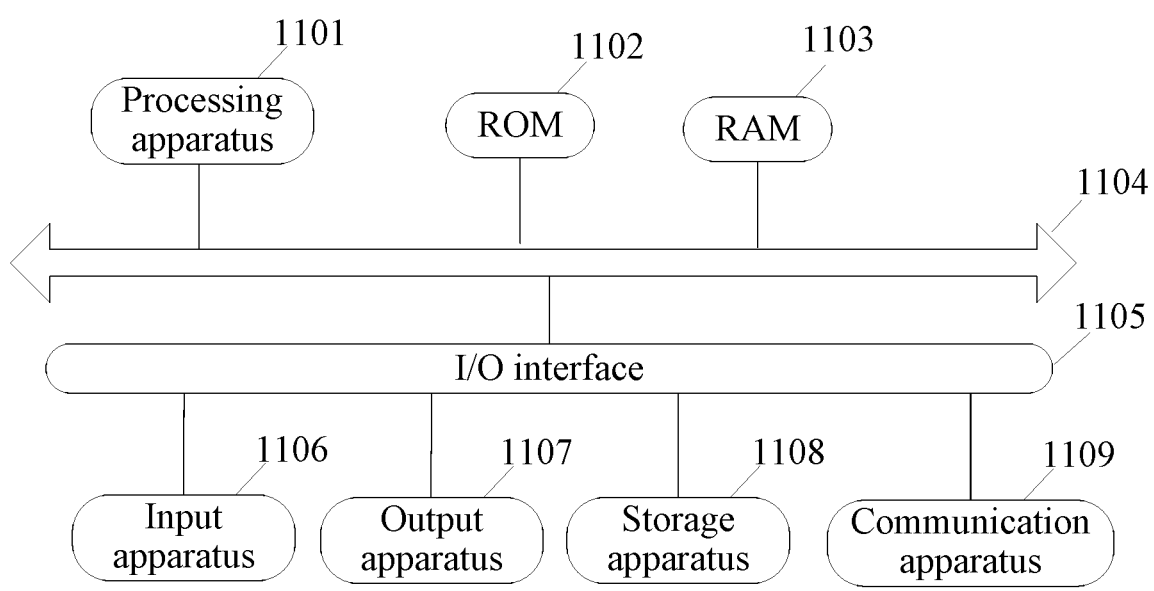
FIG. 11 is a schematic structure diagram of hardware of an electronic device provided by an embodiment of the present disclosure.

Referring to FIG. 11, it shows a structure schematic diagram of an electronic device 1100 provided by an embodiment of the present disclosure, the electronic device 1100 may be a terminal device or a server. The terminal device can include but is not limited to a mobile terminal, such as a mobile phone, a laptop, a digital broadcast receiver, a personal digital assistant (Personal Digital Assistant, PDA for short), a portable android device (Portable Android Device, PAD for short), a portable media player (Portable Media Player, PMP for short), an on-board terminal (such as an on-board navigation terminal), etc., and a fixed terminal, such as a digital TV, a desktop computer, etc. The electronic device shown in FIG. 11 is only an example and should not impose any limitations on functionality and the scope of use of the embodiment of the present disclosure.

As shown in FIG. 11, the electronic device 1100 may include a processing apparatus (such as, a central processing unit, a graphics processor and the like) 1101, which can execute various appropriate actions and processes according to a program stored in a read only memory (Read Only Memory, ROM for short) 1102 or a program loaded into a random access memory (Random Access Memory, RAM for short) 1103 from a storage apparatus 1108. In the RAM 1103, various programs and data necessary for the operation of the electronic device 1100 are also stored. The processing apparatus 1101, ROM 1102 and RAM 1103 are connected to each other through a bus 1104. An input/output (I/O) interface 1105 is also connected to the bus 1104.

Typically, the following apparatus may be connected to the I/O interface 1105: an input apparatus 1106 including, for example, a touch screen, a touch pad, a keyboard, a mouse, a camera, a microphone, an accelerometer, a gyroscope and the like; an output apparatus 1107 including, for example, a liquid crystal display (Liquid Crystal Display, LCD for short), a speaker, a vibrator and the like; a storage apparatus 1108 including, for example, a magnetic tape, a hard disk and like; and a communication apparatus 1109. The communication apparatus 1109 may allow the electronic device 1100 to communicate wirelessly or wiredly with other devices to exchange data. While FIG. 11 shows the electronic device 1100 with various apparatuses, it should be understood that not all of the illustrated apparatuses are required to be implemented or provided. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product including a computer program carried on a computer readable medium, the computer program containing program codes for executing the methods illustrated in the flowcharts. In such embodiments, the computer program may be downloaded and installed from the network via the communication apparatus 1109, or installed from the storage apparatus 1108, or installed from the ROM 1102. When the computer program is executed by the processing apparatus 1101, steps in the methods of the embodiments of the present disclosure are executed to realize the above-mentioned functions defined by the computer program.

An embodiment of the present disclosure further provides a computer program product, where the computer program product includes a computer program, the computer program is stored in a readable storage medium, one or more processors of an electronic device can read the computer program from the readable storage medium, and the one or more processors executes the computer program, to enable the electronic device to execute a solution provided by any of the above-mentioned embodiments.

An embodiment of the present disclosure further provides a computer program, where the computer program is stored in a readable storage medium, one or more processors of an electronic device can read the computer program from the readable storage medium, and the one or more processors executes the computer program, to enable the electronic device to execute a solution provided by any of the above-mentioned embodiments.

It should be noted that, the above-mentioned computer readable medium in the present disclosure may be a computer readable signal medium or a computer readable storage medium, or any combination of the above two. The computer readable storage medium may be, but not limited to, for example, an electrical, magnetic, optical, electromagnetic, infrared, or semiconductor system, apparatus or device, or a combination of any of the above. More specific examples of the computer readable storage media may include, but are not limited to, an electrical connection with one or more wires, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device or any suitable combination of the above. In the present disclosure, the computer readable storage medium may be any tangible medium in which the program is contained or stored, and the program can be used by or in conjunction with an instruction execution system, apparatus, or device. In the present disclosure, the computer readable signal medium may include a data signal propagated in a baseband or as a part of a carrier wave, and carries computer readable program codes therein. The propagated data signal may take a variety of forms, including but not limited to an electromagnetic signal, an optical signal or any suitable combination of the above. The computer readable signal medium may also be any computer readable medium other than the computer readable storage medium, the computer readable signal medium can transmit, propagate or transport the program for use by or in conjunction with the instruction execution system, apparatus or device. Program codes contained in the computer readable medium may be transmitted by any suitable medium, which includes, but not limited to, an electrical wire, an optical fiber cable, an RF (radio frequency) or the like, or any suitable combination of the above.

The computer readable medium may be contained in the above electronic device; or may exist alone without being assembled into the electronic device.

The above computer readable medium carries one or more programs, and when the one or more programs are executed by the electronic device, the electronic device is enabled to execute the methods shown in the above embodiments.

Computer program codes for performing operations of the present disclosure may be written in one or more programming languages or a combination thereof, the above programming language includes but not limited to object-oriented programming languages, such as Java, Smalltalk, C++, and also includes conventional procedural programming languages, such as the "C" language or similar programming languages. The program codes may be executed entirely on a user's computer, partly on the user's computer, as a stand-alone software package, partly on the user's computer and partly on a remote computer, or entirely on the remote computer or a server. In a case involving the remote computer, the remote computer may be connected to the user's computer through any kind of network, including the local area network (Local Area Network, LAN for short) or wide area network (Wide Area Network, WAN for short), or may be connected to an external computer (for example, connected through the Internet using an Internet service provider).

Flowcharts and block diagrams in the drawings illustrate possible architectures, functionalities, and operations of systems, methods, and computer program products according to various embodiments of the present disclosure. In this point, each block in the flowchart or the block diagram may represent a module, a program segment or a portion of codes, and the module, program segment or portion of codes contains one or more executable instructions for implementing the specified logical function. It should also be noted that, in some alternative implementations, the functions indicated in the blocks may occur in an order different from that indicated in the figures. For example, two blocks shown in succession may, in fact, be executed substantially concurrently, or may sometimes be executed in the reverse order, which is depended upon the functionality involved. It is also noted that each block in the block diagrams and/or flowcharts, and combinations of blocks in the block diagrams and/or flowcharts, can be implemented in a dedicated hardware-based system that performs specified functions or operations, or can be implemented in a combination of dedicated hardware and computer instructions.

Units involved in the embodiments of the present disclosure may be implemented in a software manner, and may also be implemented in a hardware manner. The name of a unit does not constitute a limitation of the unit itself under certain circumstances, for example, the first acquiring unit may also be described as "a unit acquiring at least two Internet Protocol addresses".

The functions above described herein may be performed, at least in part, by one or more hardware logic components. For example, without limitation, exemplary types of hardware logic components that may be used include: a field programmable gate array (Field Programmable Gate Array, FPGA), an application specific integrated circuit (Application Specific Integrated Circuit, ASIC), an Application Specific Standard Product (Application Specific Standard Product, ASSP), a system on a chip (System on a Chip, SOC), a complex programmable logical device (Complex Programmable Logical Device, CPLD) and the like.

In the context of the present disclosure, a machine readable medium may be a tangible medium that may contain or store a program for use by or in conjunction with the instruction executable system, apparatus, or device. The machine-readable medium may be a machine-readable signal medium or a machine-readable storage medium. The machine readable medium may include, but not limited to, an electronic, magnetic, optical, electromagnetic, infrared or semiconductor system, apparatus or device, or any suitable combination of the above. More specific examples of the machine readable storage medium would include one or more wires-based electrical connections, portable computer disks, hard disks, random access memory (RAM), read only memory (ROM), erasable programmable read-only memory (EPROM or flash memory), fiber optics, compact disk read only memory (CD-ROM), optical storage devices, magnetic storage devices, or any suitable combination of the above.

In a first aspect, according to one or more embodiments of the present disclosure, a screen projection control method is provided, which is applied to a first device, where the method includes:
acquiring touch information sent by a second device, where the touch information includes a touch type, a coordinate position of a touch point on a screen of the second device, and a screen rotation direction of the second device, the screen of the second device and a screen of the first device display a same interface; and
determining, according to the screen rotation direction of the second device, a target position on the screen of the first device corresponding to the coordinate position of the touch point, where the target position is a position for performing a touch operation corresponding to the touch type.

According to one or more embodiments of the present disclosure, the determining, according to the screen rotation direction of the second device, the target position on the screen of the first device corresponding to the coordinate position of the touch point includes:
acquiring screen information of the first device; and
performing, according to the screen information of the first device and the screen rotation direction of the second device, a conversion on the coordinate position of the touch point, to obtain the target position.

According to one or more embodiments of the present disclosure, the screen information of the first device includes a screen rotation direction of the first device and size information of the screen of the first device, and the performing, according to the screen information of the first device and the screen rotation direction of the second device, the conversion on the coordinate position of the touch point, to obtain the target position includes:
when it is determined that the screen rotation direction of the first device and the screen rotation direction of the second device are the same, performing, according to the size information of the screen of the first device, the conversion on the coordinate position of the touch point based on a first preset rule, to obtain the target position; and
when it is determined that the screen rotation direction of the first device and the screen rotation direction of the second device are different, performing, according to the size information of the screen of the first device, the conversion on the coordinate position of the touch point based on a second preset rule, to obtain the target position.

According to one or more embodiments of the present disclosure, the coordinate position of the touch point includes a proportional width coordinate and a proportional height coordinate of the touch point; the target position includes a target width coordinate and a target height coordinate; the size information of the screen of the first device includes a width and a height of the screen of the first device.

According to one or more embodiments of the present disclosure, the first preset rule is $TX=Width*OX$, $TY=Height*OY$, where TX is the target width coordinate, Width is the width of the screen of the first device, OX is the proportional width coordinate of the touch point, TY is the target height coordinate, Height is the height of the screen of the first device, and OY is the proportional height coordinate of the touch point.

According to one or more embodiments of the present disclosure, the second preset rule is $TX=Width*OY$, $TY=Height*(1-OX)$, where TX is the target width coordinate, Width is the width of the screen of the first device, OY is the proportional height coordinate of the touch point, TY is the target height coordinate, Height is the height of the screen of the first device, and OX is the proportional width coordinate of the touch point.

According to one or more embodiments of the present disclosure, the touch information is generated based on a preset touch event transfer protocol.

In a second aspect, according to one or more embodiments of the present disclosure, a screen projection control method is provided, which is applied to a second device, where the method includes:

acquiring, in response to a touch operation acting on a screen of the second device, corresponding touch information, where the touch information includes a touch type, a coordinate position of a touch point corresponding to the touch operation on the screen of the second device, and a screen rotation direction of the second device; and sending the touch information to a first device, to enable the first device to determine, according to the screen rotation direction of the second device, a target position on a screen of the first device corresponding to the coordinate position of the touch point, where the target position is a position for performing a touch operation corresponding to the touch type.

According to one or more embodiments of the present disclosure, the generating the corresponding touch information includes:

acquiring the touch type corresponding to the touch operation and the screen rotation direction of the second device; and generating, based on the preset touch event transfer protocol, the touch information according to the touch type, the coordinate position of the touch point, and the screen rotation direction of the second device.

According to one or more embodiments of the present disclosure, the coordinate position of the touch point includes a proportional width coordinate and a proportional height coordinate of the touch point; the method further includes:

acquiring size information of the screen of the second device, where the size information of the screen of the second device includes a width of the screen of the second device and a height of the screen of the second device;

acquiring, for each touch point, an actual width coordinate and an actual height coordinate of the touch point, and acquiring a ratio of the actual width coordinate to the width of the screen of the second device and using it as the proportional width coordinate of the touch point; and acquiring a ratio of the actual height coordinate to the height of the screen of the second device and using it as the proportional height coordinate of the touch point.

In a third aspect, according to one or more embodiments of the present disclosure, a screen projection control device is provided, which is applied to a first device, where the screen projection control device includes:

a first transceiver module, configured to acquire touch information sent by a second device, where the touch information includes a touch type, a coordinate position of a touch point on a screen of the second device, and a screen rotation direction of the second device, the screen of the second device and a screen of the first device display a same interface; and a first processing module, configured to determine, according to the screen rotation direction of the second device, a target position on the screen of the first device corresponding to the coordinate position of the touch point, where the target position is a position for performing a touch operation corresponding to the touch type.

According to one or more embodiments of the present disclosure, the first processing module is further configured to:

acquire screen information of the first device; and perform, according to the screen information of the first device and the screen rotation direction of the second device, a conversion on the coordinate position of the touch point, to obtain the target position.

According to one or more embodiments of the present disclosure, the screen information of the first device includes a screen rotation direction of the first device and size information of the screen of the first device; and the first processing module is further configured to:

when it is determined that the screen rotation direction of the first device and the screen rotation direction of the second device are the same, perform, according to the size information of the screen of the first device, the conversion on the coordinate position of the touch point based on a first preset rule, to obtain the target position; and when it is determined that the screen rotation direction of the first device and the screen rotation direction of the second device are different, performing, according to the size information of the screen of the first device, the conversion on the coordinate position of the touch point based on a second preset rule, to obtain the target position.

According to one or more embodiments of the present disclosure, the coordinate position of the touch point includes a proportional width coordinate and a proportional height coordinate of the touch point; the target position includes a target width coordinate and a target height coordinate; the size information of the first device includes a width and a height of the screen of the first device.

According to one or more embodiments of the present disclosure, the first preset rule is $TX=Width*OX$, $TY=Height*OY$, where $TX$ is the target width coordinate, Width is the width of the screen of the first device, $OX$ is the proportional width coordinate of the touch point, $TY$ is the target height coordinate, Height is the height of the screen of the first device, and $OY$ is the proportional height coordinate of the touch point.

According to one or more embodiments of the present disclosure, the second preset rule is $TX=Width*OY$, $TY=Height*(1-OX)$, where $TX$ is the target width coordinate, Width is the width of the screen of the first device, $OY$ is the proportional height coordinate of the touch point, $TY$ is the target height coordinate, Height is the height of the screen of the first device, and $OX$ is the proportional width coordinate of the touch point.

According to one or more embodiments of the present disclosure, the touch information is generated based on a preset touch event transfer protocol.

In a fourth aspect, according to one or more embodiments of the present disclosure, a screen projection control device is provided, which is applied to a second device, where the screen projection control device includes:

a second processing module, configured to generate, in response to a touch operation acting on a screen of the second device, corresponding touch information, where the touch information includes a touch type, a coordinate position of a touch point corresponding to the touch operation on the screen of the second device, and a screen rotation direction of the second device; and a second transceiver module, configured to send the touch information to a first device, to enable the first device to determine, according to the screen rotation direction of the second device, a target position on a screen of the first device corresponding to the coordinate position of the touch point, where the target position is a position for performing a touch operation corresponding to the touch type.

According to one or more embodiments of the present disclosure, the second processing module is further configured to:
acquire the touch type corresponding to the touch operation and the screen rotation direction of the second device; and
generate, based on the preset touch event transfer protocol, the touch information according to the touch type, the coordinate position of the touch point, and the screen rotation direction of the second device.

According to one or more embodiments of the present disclosure, the coordinate position of the touch point includes a proportional width coordinate and a proportional height coordinate of the touch point; and the second processing module is further configured to:
acquire size information of the screen of the second device, where the size information of the screen of the second device includes a width of the screen of the second device and a height of the screen of the second device;
acquire, for each touch point, an actual width coordinate and an actual height coordinate of the touch point, and acquire a ratio of the actual width coordinate to the width of the screen of the second device and use it as the proportional width coordinate of the touch point; and
acquire a ratio of the actual height coordinate to the height of the screen of the second device and use it as the proportional height coordinate of the touch point.

In a fifth aspect, according to one or more embodiments of the present disclosure, an electronic device is provided, and includes: at least one processor and a memory;
where the memory has, stored therein, computer executable instructions; and
the at least one processor executes the computer executable instructions stored in the memory, to enable the at least one processor to execute the screen projection control method as described above in the first aspect and various possible designs of the first aspect.

In a sixth aspect, according to one or more embodiments of the present disclosure, an electronic device is provided, and includes: at least one processor and a memory;
where the memory has, stored therein, computer executable instructions; and
the at least one processor executes the computer executable instructions stored in the memory, to enable the at least one processor to execute the screen projection control method as described above in the second aspect and various possible designs of the second aspect.

In a seventh aspect, according to one or more embodiments of the present disclosure, a computer readable storage medium is provided. Computer executable instructions are stored in the computer readable storage medium. When a processor executes the computer executable instructions, the screen projection control method as described above in the first aspect and various possible designs of the first aspect is implemented.

In an eighth aspect, according to one or more embodiments of the present disclosure, a computer readable storage medium is provide. Computer executable instructions are stored in the computer readable storage medium. When a processor executes the computer executable instructions, the screen projection control method as described above in the second aspect and various possible designs of the second aspect is implemented.

In a ninth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the first aspect and various possible designs of the first aspect.

In a tenth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the second aspect and various possible designs of the second aspect.

In an eleventh aspect, an embodiment of the present disclosure also provides a computer program, where the computer program is stored in a readable storage medium, one or more processors of an electronic device can read the computer program from the readable storage medium, and the one or more processors executes the computer program, to enable the electronic device to implement the screen projection control method as described above in the first aspect and various possible designs of the first aspect.

In a twelfth aspect, an embodiment of the present disclosure also provides a computer program product, where the computer program product includes a computer program, the computer program is stored in a readable storage medium, one or more processors of an electronic device can read the computer program from the readable storage medium, and the one or more processors executes the computer program, to enable the electronic device to implement the screen projection control method as described above in the second aspect and various possible designs of the second aspect.

The above description is merely preferred embodiments of the present disclosure and an illustration of technical principles employed. Those skilled in the art should understand that the disclosure scope involved in the present disclosure is not limited to technical solutions formed by a specific combination of the above mentioned technical features, and should also cover other technical solutions formed by any combination of the above technical features or their equivalents without departing from the above disclosed concept, such as a technical solution formed by replacing the above technical features with the technical features disclosed in the present disclosure (but not limited to) with similar functions.

Additionally, although respective operations are described in a particular order, this should not be construed as requiring that the operations be performed in the shown particular order or executed in a sequential order. Under a certain circumstance, multitasking and parallel processing may be advantageous. Likewise, although several specific implementations are contained in the above discussion, these should not be construed as limitations on the scope of the present disclosure. Certain features that are described in the context of separate embodiments can also be implemented in combination in a single embodiment. Conversely, various features that are described in the context of the single embodiment can also be implemented in multiple embodiments separately or in any suitable sub-combination.

Although the subject matters have been described in language specific to structured features and/or methodological logical acts, it is to be understood that the subject matters defined in the appended claims are not necessarily limited to specific features or actions described above. Rather, the specific features and actions described above are merely exemplarily forms for implementing the claims.

What is claimed is:

1. A screen projection control method applied to a first device, the method comprising:
acquiring touch information sent by a second device, wherein the touch information comprises a touch type, a coordinate position of a touch point on a screen of the second device, and a screen rotation direction of the second device, wherein the screen of the second device and a screen of the first device display a same interface, wherein the coordinate position of the touch point comprises a proportional width coordinate and a proportional height coordinate of the touch point, the proportional width coordinate of the touch point being a proportion of an actual width coordinate of the touch point to a width of the screen of the second device, the proportional height coordinate of the touch point being a proportion of an actual height coordinate of the touch point to a height of the screen of the second device, and wherein the touch information is determined based on a user inputting a touch operation corresponding to the touch type on the screen of the second device, wherein the touch type indicates whether a type of the touch operation from the user is a single-finger touch type or a multi-finger touch type; and
converting, according to the screen rotation direction of the second device, the coordinate position of the touch point on the screen of the second device into a target position on the screen of the first device, wherein the target position is a position for performing the touch operation corresponding to the touch type.

2. The method according to claim 1, wherein the converting, according to the screen rotation direction of the second device, the coordinate position of the touch point on the screen of the second device into the target position on the screen of the first device comprises:
acquiring screen information of the first device; and
performing, according to the screen information of the first device and the screen rotation direction of the second device, a conversion on the coordinate position of the touch point, to obtain the target position.

3. The method according to claim 2, wherein the screen information of the first device comprises a screen rotation direction of the first device and size information of the screen of the first device, and the performing, according to the screen information of the first device and the screen rotation direction of the second device, the conversion on the coordinate position of the touch point, to obtain the target position comprises:
when it is determined that the screen rotation direction of the first device and the screen rotation direction of the second device are the same, performing, according to the size information of the screen of the first device, the conversion on the coordinate position of the touch point based on a first preset rule, to obtain the target position; and
when it is determined that the screen rotation direction of the first device and the screen rotation direction of the second device are different, performing, according to the size information of the screen of the first device, the conversion on the coordinate position of the touch point based on a second preset rule, to obtain the target position.

4. The method according to claim 3, wherein
the target position comprises a target width coordinate and a target height coordinate, and
the size information of the screen of the first device comprises a width and a height of the screen of the first device.

5. The method according to claim 4, wherein the first preset rule is TX=Width*OX, TY=Height*OY, wherein TX is the target width coordinate, Width is the width of the screen of the first device, OX is the proportional width coordinate of the touch point, TY is the target height coordinate, Height is the height of the screen of the first device, and OY is the proportional height coordinate of the touch point.

6. The method according to claim 4, wherein the second preset rule is TX=Width*OY, TY=Height*(1−OX), wherein TX is the target width coordinate, Width is the width of the screen of the first device, OY is the proportional height coordinate of the touch point, TY is the target height coordinate, Height is the height of the screen of the first device, and OX is the proportional width coordinate of the touch point.

7. The method according to claim 1, wherein the touch information is generated based on a preset touch event transfer protocol.

8. A non-transitory computer readable storage medium in which computer executable instructions are stored, wherein when a processor executes the computer executable instructions, the screen projection control method according to claim 1 is implemented.

9. A screen projection control method applied to a second device, the method comprising:
generating, in response to a touch operation acting on a screen of the second device, corresponding touch information, wherein the touch information comprises a touch type, a coordinate position of a touch point corresponding to the touch operation on the screen of the second device, and a screen rotation direction of the second device, wherein the coordinate position of the touch point comprises a proportional width coordinate and a proportional height coordinate of the touch point, the proportional width coordinate of the touch point being a proportion of an actual width coordinate of the touch point to a width of the screen of the second device, the proportional height coordinate of the touch point being a proportion of an actual height coordinate of the touch point to a height of the screen of the second device, and wherein the touch information is determined based on a user inputting a touch operation corresponding to the touch type on the screen of the second device, wherein the touch type indicates whether a type of the touch operation from the user is a single-finger touch type or a multi-finger touch type; and
sending the touch information to a first device, to enable the first device to convert, according to the screen rotation direction of the second device, the coordinate position of the touch point on the screen of the second device into a target position on a screen of the first device, wherein the target position is a position for performing the touch operation corresponding to the touch type.

10. The method according to claim 9, wherein the generating the corresponding touch information comprises:
acquiring the touch type corresponding to the touch operation and the screen rotation direction of the second device; and
generating, based on a preset touch event transfer protocol, the touch information according to the touch type, the coordinate position of the touch point and the screen rotation direction of the second device.

11. The method according to claim 10, further comprising:
acquiring size information of the screen of the second device, wherein the size information of the screen of the second device comprises a width of the screen of the second device and a height of the screen of the second device;
acquiring, for each touch point, the actual width coordinate and the actual height coordinate of the touch point, and acquiring a ratio of the actual width coordinate to the width of the screen of the second device and using the ratio as the proportional width coordinate of the touch point; and
acquiring a ratio of the actual height coordinate to the height of the screen of the second device and using the ratio as the proportional height coordinate of the touch point.

12. The method according to claim 9, further comprising:
acquiring size information of the screen of the second device, wherein the size information of the screen of the second device comprises a width of the screen of the second device and a height of the screen of the second device;
acquiring, for each touch point, the actual width coordinate and the actual height coordinate of the touch point, and acquiring a ratio of the actual width coordinate to the width of the screen of the second device and using the ratio as the proportional width coordinate of the touch point; and
acquiring a ratio of the actual height coordinate to the height of the screen of the second device and using the ratio as the proportional height coordinate of the touch point.

13. A screen projection control device applied to a second device, the screen projection control device comprising: at least one processor and a memory;
wherein the memory has, stored therein, computer executable instructions; and
the at least one processor executes the computer executable instructions stored in the memory, to enable the at least one processor to execute the screen projection control method according to claim 9.

14. A non-transitory computer readable storage medium in which computer executable instructions are stored, wherein when a processor executes the computer executable instructions, the screen projection control method according to claim 9 is implemented.

15. A screen projection control device applied to a first device, the screen projection control device comprising: at least one processor and a memory;
wherein the memory has, stored therein, computer executable instructions; and
the at least one processor performs the computer executable instructions stored in the memory, to enable the at least one processor to:
acquire touch information sent by a second device, wherein the touch information comprises a touch type, a coordinate position of a touch point on a screen of the second device, and a screen rotation direction of the second device, wherein the screen of the second device and a screen of the first device display a same interface, wherein the coordinate position of the touch point comprises a proportional width coordinate and a proportional height coordinate of the touch point, the proportional width coordinate of the touch point being a proportion of an actual width coordinate of the touch point to a width of the screen of the second device, the proportional height coordinate of the touch point being a proportion of an actual height coordinate of the touch point to a height of the screen of the second device, and wherein the touch information is determined based on a user inputting a touch operation corresponding to the touch type on the screen of the second device, wherein the touch type indicates whether a type of the touch operation from the user is a single-finger touch type or a multi-finger touch type; and
convert, according to the screen rotation direction of the second device, the coordinate position of the touch point on the screen of the second device into a target position on the screen of the first device, wherein the target position is a position for performing the touch operation corresponding to the touch type.

16. The screen projection control device according to claim 15, wherein the at least one processor is specifically enabled to:
acquire screen information of the first device; and
perform, according to the screen information of the first device and the screen rotation direction of the second device, a conversion on the coordinate position of the touch point, to obtain the target position.

17. The screen projection control device according to claim 16, wherein the screen information of the first device comprises a screen rotation direction of the first device and size information of the screen of the first device, and the at least one processor is specifically enabled to:
when it is determined that the screen rotation direction of the first device and the screen rotation direction of the second device are the same, perform, according to the size information of the screen of the first device, the conversion on the coordinate position of the touch point based on a first preset rule, to obtain the target position; and
when it is determined that the screen rotation direction of the first device and the screen rotation direction of the second device are different, perform, according to the size information of the screen of the first device, the conversion on the coordinate position of the touch point based on a second preset rule, to obtain the target position.

18. The screen projection control device according to claim 17, wherein
the target position comprises a target width coordinate and a target height coordinate, and
the size information of the screen of the first device comprises a width and a height of the screen of the first device.

19. The screen projection control device according to claim 18, wherein the first preset rule is $TX=Width*OX$, $TY=Height*OY$, wherein TX is the target width coordinate, Width is the width of the screen of the first device, OX is the proportional width coordinate of the touch point, TY is the target height coordinate, Height is the height of the screen of the first device, and OY is the proportional height coordinate of the touch point.

20. The screen projection control device according to claim 18, wherein the second preset rule is TX=Width*OY, TY=Height*(1−OX), wherein TX is the target width coordinate, Width is the width of the screen of the first device, OY is the proportional height coordinate of the touch point, TY is the target height coordinate, Height is the height of the screen of the first device, and OX is the proportional width coordinate of the touch point.

* * * * *